Figure 2:
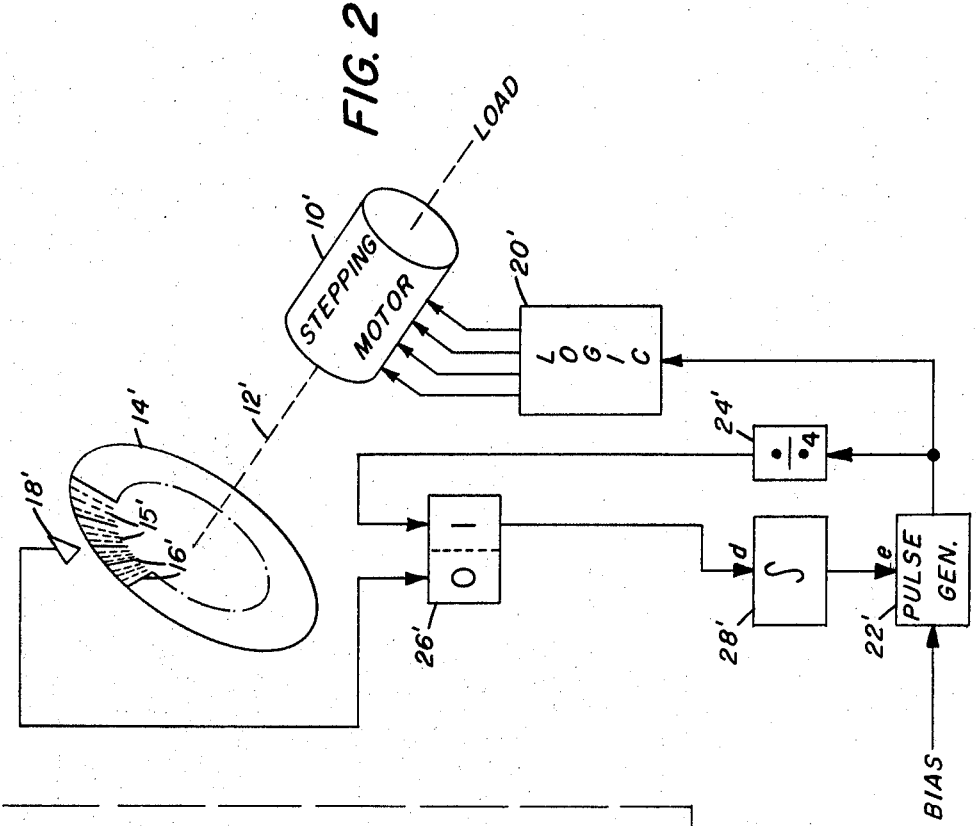

United States Patent

[11] 3,575,653

[72] Inventor: Richard T. Gucwa, Rochester, N.Y.
[21] Appl. No.: 832,176
[22] Filed: June 11, 1969
[45] Patented: Apr. 20, 1971
[73] Assignee: Eastman Kodak Company, Rochester, N.Y.

[54] STEPPING MOTOR CONTROL CIRCUIT
5 Claims, 5 Drawing Figs.

[52] U.S. Cl. ................................................. 318/685, 318/601
[51] Int. Cl. ................................................. G05b 19/40
[50] Field of Search ................................. 318/138, 254, 20.860 (685), 20.910 (696), 20.310 (601); 310/49

[56] References Cited
UNITED STATES PATENTS

| | | | |
|---|---|---|---|
| 2,814,769 | 11/1957 | Williams | 318/138X |
| 3,242,406 | 3/1966 | Tanaka | 318/138 |
| 3,368,128 | 2/1968 | Parrish | 318/138 |
| 3,374,410 | 3/1968 | Cronquist | 318/138 |
| 3,427,442 | 2/1969 | Sklaroff | 318/(20.310) 18X |
| 3,488,566 | 1/1970 | Fukuda | 318/254X |

Primary Examiner—G. R. Simmons
Attorneys—Walter O. Hodsdon and Robert F. Cody

ABSTRACT: A high resolution stepping motor is controlled by means of a "detented" feedback disc driven by the motor. The motor, which has more detents than the feedback disc, is stepped in closed-loop fashion by a variable frequency pulse generator. The ability of the motor to track its received pulses is employed to control and regulate the frequency of the pulse generator so that the ratio of the time between generator pulses and the time that it takes for the motor to index in response to a given pulse is kept constant.

RICHARD T. GUCWA
INVENTOR.

BY Walter O. Hodgson
Robert F. Cody
ATTORNEYS

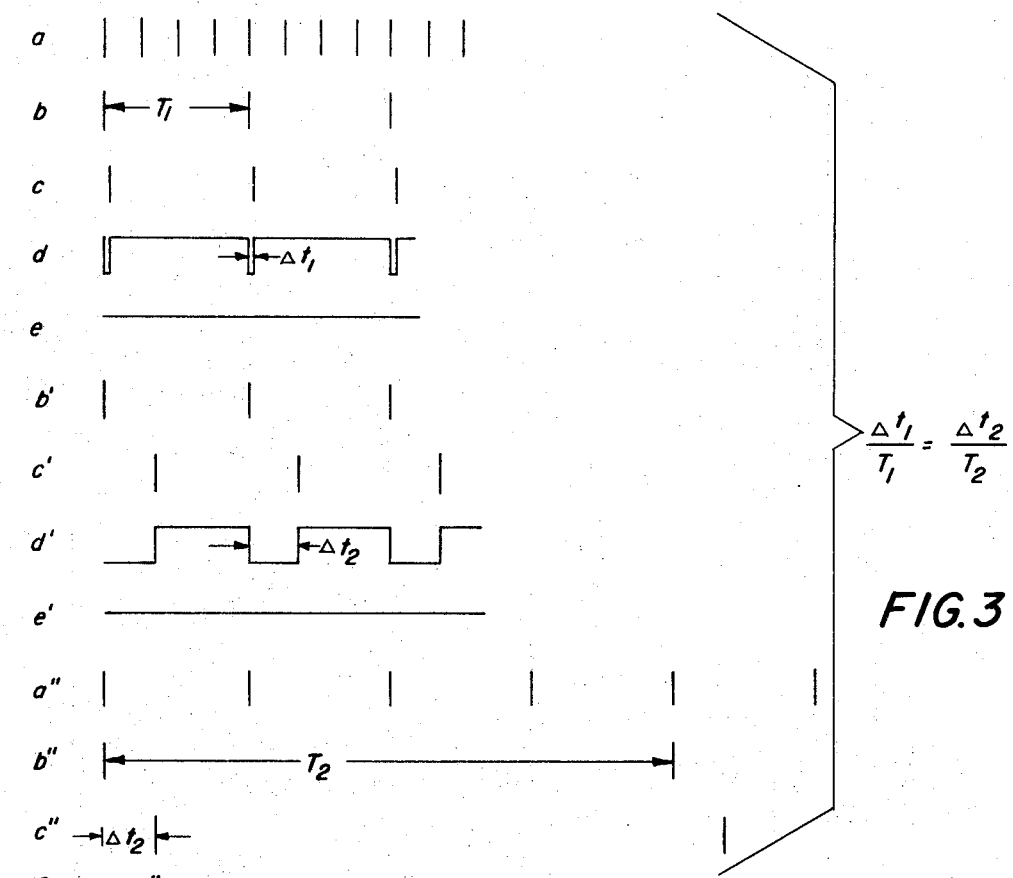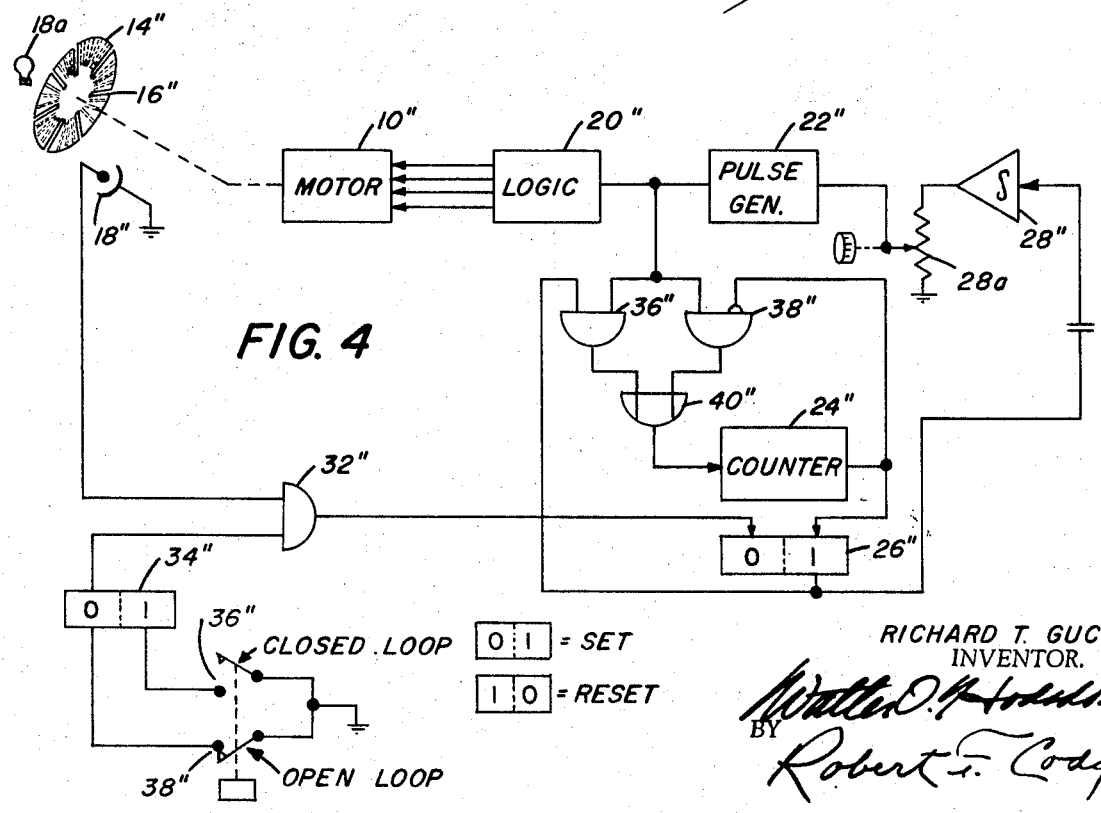

STEPPING MOTOR CONTROL CIRCUIT

BACKGROUND OF THE INVENTION

1. Field of the Invention

This invention relates to control circuits for stepping motors; and in particular to speed control of high resolution stepping motors.

2. Description Relative to the Prior Art

Stepping motors are widely used in digital systems. Each such motor incorporates, usually, a plurality of windings which are selectively excited, by means of a logic circuit, to step the motor along. The logic circuit (e.g. that of U.S. Pat. No. 3,287,569) forms no part of this invention; and is usually supplied with the motor by its manufacturer.

In indexing a stepping motor, it is obviously necessary that the motor keep in step with, i.e. track, its received pulses. To assure that such tracking occurs, it is common to employ a closed-loop feedback technique for motor control purposes: i.e. since closed-loop control of a stepping motor is self-regulating, higher stepping rates than would otherwise be possible are obtainable. In providing such feedback, it is customary to employ a feedback disc, driven by the motor, to produce—by means of detents on the disc, and a pickup sensor(s) cooperative with such detents—a train of feedback pulses for stepping the motor; such disc having as many detents as the motor has magnetic detents. See U.S. Pat Nos. 3,324,369 and 3,345,547.

Figure 1:
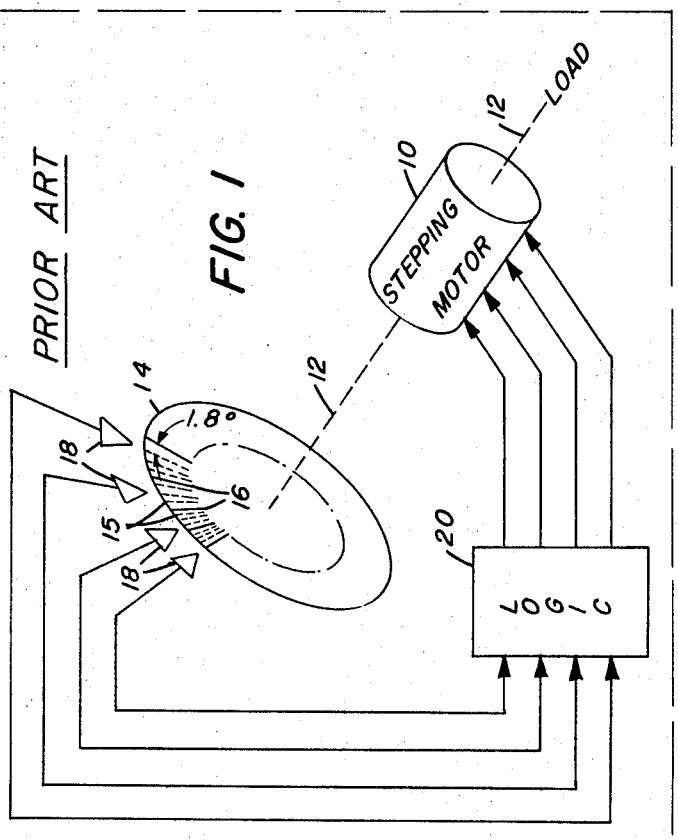

A high resolution stepping motor is one having a large number of magnetic detents per revolution of its output shaft. The above-described feedback technique is difficult to employ with high resolution stepping motors because feedback discs cannot, usually, accommodate a large number of disc detents. That is, the periphery of a disc can be packed with just so many detents, e.g. notches; and to increase the size of the disc to permit a greater number of such detents often results in too great an inertial load on the motor which must drive the disc. To permit closed-loop control of a high resolution stepping motor, the technique of FIG. 1 has been suggested:

FIG. 1 is a perspective view illustrating a prior art system over which apparatus according to the invention is an improvement.

Referring to FIG. 1, a high resolution stepping motor 10, e.g. one having say 200 magnetic detents 15 per revolution of its shaft 12 (1.8° between detents), drives a feedback disc 14. The disc 14 is sufficiently small so that it can be stepped quickly by the motor 10; but because of its small size, the disc can accommodate say only 50 detents 16 about its periphery. (The disc detents 16 may take any of a variety of forms such, for example, as discrete notches or magnets about the disc periphery). Since there are more magnetic detents 15 than there are disc detents 16, plural detent sensors 18 (equal to the number of magnetic detents divided by the number of disc detents) are employed to permit feedback control of the motor 10; and such detent sensors 18 must be carefully aligned—and so maintained even when subject to vibration etc.—about the disc 14 periphery so that as the motor is stepped along, only one detent sensor 18 is ever aligned with a disc detent 16. Pulses provided by the sensors 18 are applied to a logic circuit 20 which, in response to such pulses, selectively excites the motor 10 windings; and since the motor is effectively indexed in response to its own output, the motor 10 runs at as high a speed as possible without ever getting out of step with its input.

The difficulty of aligning detent sensors 18 wit disc detents 16, and with respect to each other, for closed-loop control of a high resolution stepping motor, is obviated by means of the invention. Also, whereas the motor of the FIG. 1 circuit will run at a speed determined mainly by its own ability to index, the invention provides closed-loop control of a high resolution stepping motor which may be set for given motor speeds.

SUMMARY OF THE INVENTION

The invention proposes the closed-loop use of a pulse generator to index a stepping motor; but rather than force such motor to keep in step with the pulse generator, the output frequency of the pulse generator is forced to track the ability of the motor to follow its indexing pulses. In accordance with the invention, the ratio of the time period between pulses from the pulse generator and the time that it takes for the motor to index in response to a given generator pulse is kept (substantially) constant. Apparatus according to the invention employs a feedback disc for purposes of closed-loop control of a stepping motor; but the invention frees such disc from the task of providing motor indexing pulses. Rather, such disc merely provides pulses against which the pulses from the pulse generator are compared phase-wise for frequency control of such pulse generator, as noted above; and since such disc is not the source of indexing pulses, the need for plural detent sensors—with their attendant alignment problem—for closed-loop control of a high resolution stepping motor is obviated.

As will be described later, apparatus according to the invention is, in its presently preferred form, operable in either open-loop or closed-loop fashion; and such apparatus automatically calibrates itself, regardless of when such apparatus is switched from one of its modes to its other mode.

An object of the invention is to provide an improved stepping motor control circuit.

Another object of the invention is to provide closed-loop control of a high resolution stepping motor by means of a variable frequency pulse generator.

Another object of the invention is to control a stepping motor according to the ratio of the time between sequential motor excitation pulses, and the time that it takes for the motor to index.

Another object of the invention is to provide stepping motor excitation by means of a pulse generator, such pulse generator having an output frequency which varies inversely as a function of the torque requirements of the motor.

Another object of the invention is to provide a stepping motor control circuit which may be operated in either open-loop or closed-loop control of such motor, and which circuit may be readily switched from one mode to the other.

Another object of the invention is to provide closed-loop control of a high resolution stepping motor by means of a variable frequency pulse generator which is so operated that the motor indexes at given speeds.

Figure 5:
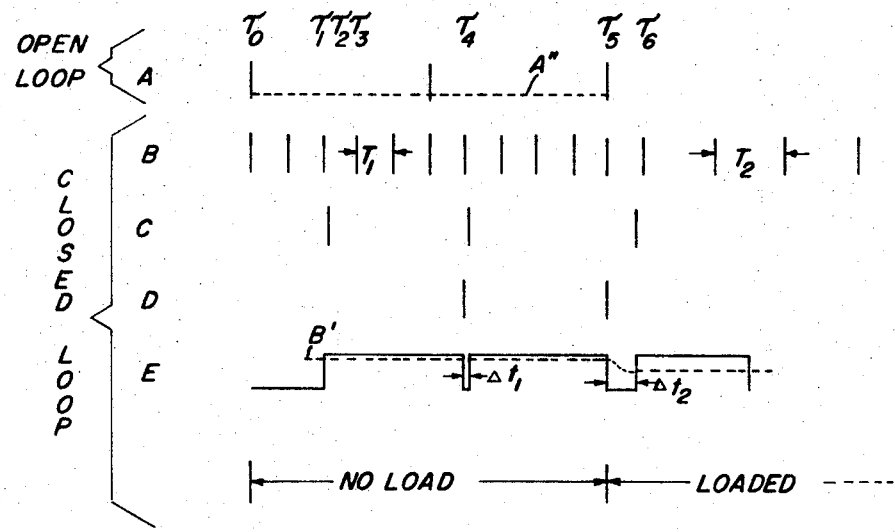

The invention will be described with reference to FIGS. 2 through 5:

FIG. 2 is a block diagram illustrating motor control according to the invention, FIG. 3 indicates a series of pulse diagrams useful in describing the operation of the circuit of FIG. 2, FIG. 4 is a block diagram illustrating the logic necessary to practice the invention in its presently preferred form, and FIG. 5 indicates a series of pulse diagrams useful in describing the operation of the circuit of FIG. 4.

Referring to FIG. 2, a high resolution stepping motor 10', while driving a load, indexes a feedback disc 14'. The feedback disc 14' is like that indicated in connection with FIG. 1, its detents 16' being however cooperative with only a single detent sensor 18'. The number of magnetic detents 15' of the motor is a multiple (in this case 4) of the number of disc detents 16'; and the motor 10' is stepped by means of pulses from a logic circuit 20'. The feedback disc 14' is so disposed on the motor shaft 12' that every fourth pulse applied to the motor 10' brings a disc detent 16' into alignment with the sensor 18'.

A pulse train is applied to the logic circuit 20' by means of a voltage controlled variable frequency pulse generator 22'. Pulse generators of this type are well known, and usually take the form of a free-running multivibrator. See, for example Electronic and Radio Engineering, Frederick Terman, McGraw Hill Publishing Company, Inc., 1965, pages 628—631. For every four pulses applied to the logic circuit 20', a circuit 24'—also connected to receive the generator 22' pulses—produces and applies an output pulse to a flip-flop circuit 26'. The circuit 24' may take the form of a conventional pulse counter which spills over and resets for every four pulses which it receives. The flip-flop 26' is disposed initially as indicated, pulses from the circuit 24' setting the flip-flop 26' to 10; and pulses produced by sensing the disc detents 16' being applied by the sensor 18' to reset the flip-flop to 01.

An integrator circuit 28' produces a DC signal level proportional to the time that the flip-flop 26' is in its indicated state, such DC level (alone or when algebraically summed with a speed control bias) being applied to regulate the frequency of the pulse generator 22'.

As above indicated, closed-loop control of the stepping motor 10' according to the invention is predicated on having the pulse generator 22' follow frequency-wise the ability of the motor 10' to track its received pulses: Since the SET and RESET pulses applied to the flip-flop 26' occur timewise apart by an amount dependent on the load on the motor, the frequency of the pulse generator 22' will vary as an inverse function of such load, thereby keeping constant the ratio of the period between generator pulses and the time that it takes for the motor to react to a given pulse. (As used herein, the term "load" means those conditions, or the like, which influence the torque requirements of the motor). To see how this is effected, reference should be had to FIG. 3:

Waveforms $a$ through $e$ represent voltages appearing at points $a$ through $e$ of the diagram of FIG. 2. Assuming there is no load on the motor 10', the generator pulses ($a$) are indicated as occurring at a fairly high rate because the interval $\Delta t_1$, i.e. the time that it takes for the "unloaded" motor to index ($c$) after having been pulsed ($b$)—is small; and therefore the time integral ($e$) of the flip-flop 26' output ($d$) is substantial. If, however, a load were to have been placed on the motor 10'—thereby causing a larger time interval $\Delta t_2$ during which the motor 10' would index ($c$) after having been pulsed ($b$)—the time integral ($e'$) of the flip-flop output ($d'$) would be less. And accordingly, with a load on the motor 10' the pulse frequency output of the generator 22' would decrease ($b''$) to maintain constant the ration $\Delta t/T$, and thus keep the motor assuredly in step with its received pulses, while running such motor at as high a speed as is possible.

Operation of the circuit of FIG. 2 is based on using the pulses from the pulse generator 22' as references for pulses provided by the detent sensor 18': By instead using the pulses from the detent sensor as references for the pulses from the pulse generator, the above-described techniques may be employed for selective open- or closed-loop control of a stepping motor; and in a form which automatically calibrates itself. Referring to FIG. 4, a variable frequency pulse generator 22'' applies pulses through a logic circuit 20'' to a high resolution stepping motor 10'' at a rate proportional to the voltage developed across a potentiometer 28a. The motor 10'' drives a notched feedback disc 14'', the motor having a discrete multiple (four times as many) of magnetic detents greater than the number of notches 16'' in the disc 14''. A single photocell 18'' detects light from a lamp 18a whenever a disc notch 16'' is aligned with and between the photocell and lamp.

The voltage applied across the potentiometer 28a is derived from an integrator 28'' which provides a DC signal level proportional to the time integral of the output square wave of a flip-flop 26''. The flip-flop 26'' is shown in FIG. 4 in its 01 SET state. The photocell 18'' output pulses are applied to an AND gate 32'' which is opened and closed, by a flip-flop 34'', respectively whenever a switch 36'' is closed and opened (a switch 38'' being simultaneously opened and closed).

Output pulses from the AND gate 32'' are applied to switch the flip-flop 26'' when such flip-flop is in its 10 RESET state.

Aside from being applied to the logic circuit 20'', the pulses from the pulse generator 22'' are applied, for calibration purposes, to AND and inhibit gates 36'', 38'', the outputs of which are applied through an OR gate 40'' to a counter 24''. The counter 24'' is of the "count-to-four and spill over" type which applies its pulse output to reset the flip-flop 26''. When the flip-flop 26'' is in its SET state, it holds the AND gate 36'' open; and only when the counter 24'' produces an output pulse is the inhibit gate 38'' held closed.

With the switch 38'' closed (switch 36'' open), the circuit of FIG. 4 steps the motor 10'' in open-loop fashion at a low rate (waveform A, FIG. 5) dependent on the quiescent output A'' of the integrator 28''. Such circuit immediately calibrates itself as follows:

a. If the flip-flop 26'' is SET 01, and if the counter 24'' is at any but its ZERO count, the AND gate 36'' is held open, thereby allowing the pulses from the pulse generator 22'' to set the counter to its ZERO state; at which time the counter spills over to RESET 10 the flip-flop 26''.

b. If the flip-flop 26'' is in its desired initial RESET 10 state, and if the counter 24'' is not at its ZERO count, the generator pulse will paSs through the inhibit gate 38'' to bring the counter 24'' to its ZERO count. Since the flip-flop 26'' is, at this time, already in its desired RESET 10 state, it will so remain.

c. If the counter 24'' is at its desired ZERO count, and if the flip-flop 26'' is initially in its SET 01 state, the counter 24'' will be stepped along –for four counts –until it produces a ZERO count gate 38'' inhibit pulse and simultaneously resets 10 the flip-flop 26''.

With the counter 24'' and flip-flop 26'' in their desired initial states (ZERO count and RESET at 10), the motor control circuit of FIG. 4 may be placed in its high speed closed-loop mode of operation. This is done by closing the switch 36'', thereby opening the AND gate 32''. Both the counter 24'' and flip-flop 26'' will, however, stay in their "initial" states until a notch 16'' in the feedback disc 14'' aligns with the photocell 18'', thereby setting 01 the flip-flop 26'' so that pulses may be applied to the counter 24'' via the AND gate 36'' to move the counter off its inhibiting ZERO count.

Assuming there is no load on the motor 10'', and assuming the switch 36'' is closed at time $\tau_0$, the closed-loop stepping rate (waveform B, FIG. 5) is determined as follows: At time $\tau_2$ which, because of the no-load condition of the motor, is soon after the pulse occurring at time $\tau_1$, a notch 16'' on the feedback disc 14'' produces a pulse (waveform C) which sets 01 the flip-flop 26''. A little later, $\tau_3$, the first pulse from the pulse generator 22'' is applied to the counter 24''; and at time $\tau_4$ (waveform D) the counter 24'' resets 10 the flip-flop 26''. Thus, the flip-flop 26'' is kept in its SET state for a comparatively long time (waveform E) and attendantly the integrator 28'' produces a large signal level (waveform B') commensurate with the motor pulse rate (waveform B). Assuming now that a load is suddenly placed on the motor 10'' at time $\tau_5$ the pulse (waveform C) from the feedback disc photocell 18'' will be delayed –because of such load –until say time $\tau_6$. As a result, the duration that the flip-flop circuit 26'' is held in its SET state lessens, thereby causing the integrator 28'' signal (waveform B') to lessen also; and thus lowering the output pulse rate of the pulse generator 22'' to maintain constant the $\Delta t/T$ ratio, and thereby keep the motor in step with its excitation pulses.

It will be appreciated that whereas the circuit of FIG. 2 employs pulses from its pulse generator as references for feedback pulses, and therefore necessarily has to be aligned initially, the circuit of FIG. 4 –by employing the reverse of such procedure –permits autocalibration without prior alignment, while still effecting the concepts of the invention.

The invention has been described in detail with particular reference to preferred embodiments thereof, but it will be understood that variations and modifications can be effected within the spirit and scope of the invention. For example while four magnetic detents 15 are indicated for every disc detent 16, other ratios of magnetic detents to disc detents can be accommodated by the invention. Also, whereas a pulse-topulse comparison is disclosed as being made between every counter output pulse and a corresponding feedback pulse, the counter could be set to count say to eight, whereby every other disc detent is skipped for pulse comparison purposes; etc.

I claim:
1. In combination:
    a. a stepping motor,
    b. a logic circuit for incrementally driving said motor,
    c. indexable means driven by said motor for producing a train of pulses at a rate proportional to the rate at which said motor is driven,
    d. a variable frequency pulse generator for applying pulses to said logic circuit to drive said motor, the pulses from said pulse generator having corresponding pulses in said train of pulses,
    e. means responsive to the pulses from said indexable means and from said pulse generator to vary the output frequency of said pulse generator as an inverse function of the time interval between the said corresponding pulses, wherein said indexable means being adapted to produce a first number of pulses for each complete rotation of the shaft of said motor, wherein said motor having a quantity of magnetic detents equal to a discrete multiple of said number, wherein said means responsive to pulses from said indexable means and from said pulse generator means comprises:
        a. means cooperative with said pulse generator for producing a pulse for each said multiple of pulses that it receives,
        b. means responsive to pulses from said last-named means and from said indexable means for producing a signal proportional to the time interval between consecutive pairs of its received pulses, and
        c. means for varying the output frequency of said pulse generator in accordance with said signal.
2. The combination of claim 1 including means for selectively modifying said signal.
3. In combination with:
    a. a stepping motor having a first number of magnetic detents,
    b. a feedback disc driven by said motor and having a second number of detents, said first number being a multiple of said second number,
    c. detector means cooperative with said feedback disc for registering the alignment of a disc detent with said detector means, and
    d. a logic circuit for selectively exciting the windings of said motor according to a predetermined sequence, the improvement comprising:
        1. a variable frequency pulse generator adapted to apply its output pulses to said logic circuit,
        2. counter means adapted to receive said pulses from said pulse generator and produce a pulse for each multiple of pulses it receives,
        3. flip-flop means adapted to be set and reset by said detector means output signal and said counter means output signal, and
        4. means for regulating the output frequency of said pulse generator as a function of time that said flip-flop means is in one of its states.
4. The improvement of claim 3
    a. wherein said variable frequency pulse generator is frequency responsive to a DC signal output,
    b. wherein said means for regulating produces a DC signal proportional to the said time that said flip-flop means is in a first of its states, and
    c. wherein said improvement includes means for selectively modifying said DC signal to establish various stepping rates for said motor.
5. The improvement of claim 4 including logic means for so setting said counter means that a multiple of pulses must first be applied to said counter means before said counter means produces an output pulse, and for so setting said flip-flop means to its second state that the said means for regulating produces a DC signal representative of a quiescent low stepping rate for said motor, said logic means being adapted to maintain the settings of said counter means and said flip-flop means until said flip-flop means is first reset to its said first state wherein said logic means includes means cooperative with said detector means for setting said flip-flop means to its said first state.